July 29, 1941.   L. C. BROWN   2,251,111
FOOD COOKING APPARATUS
Filed Dec. 18, 1939
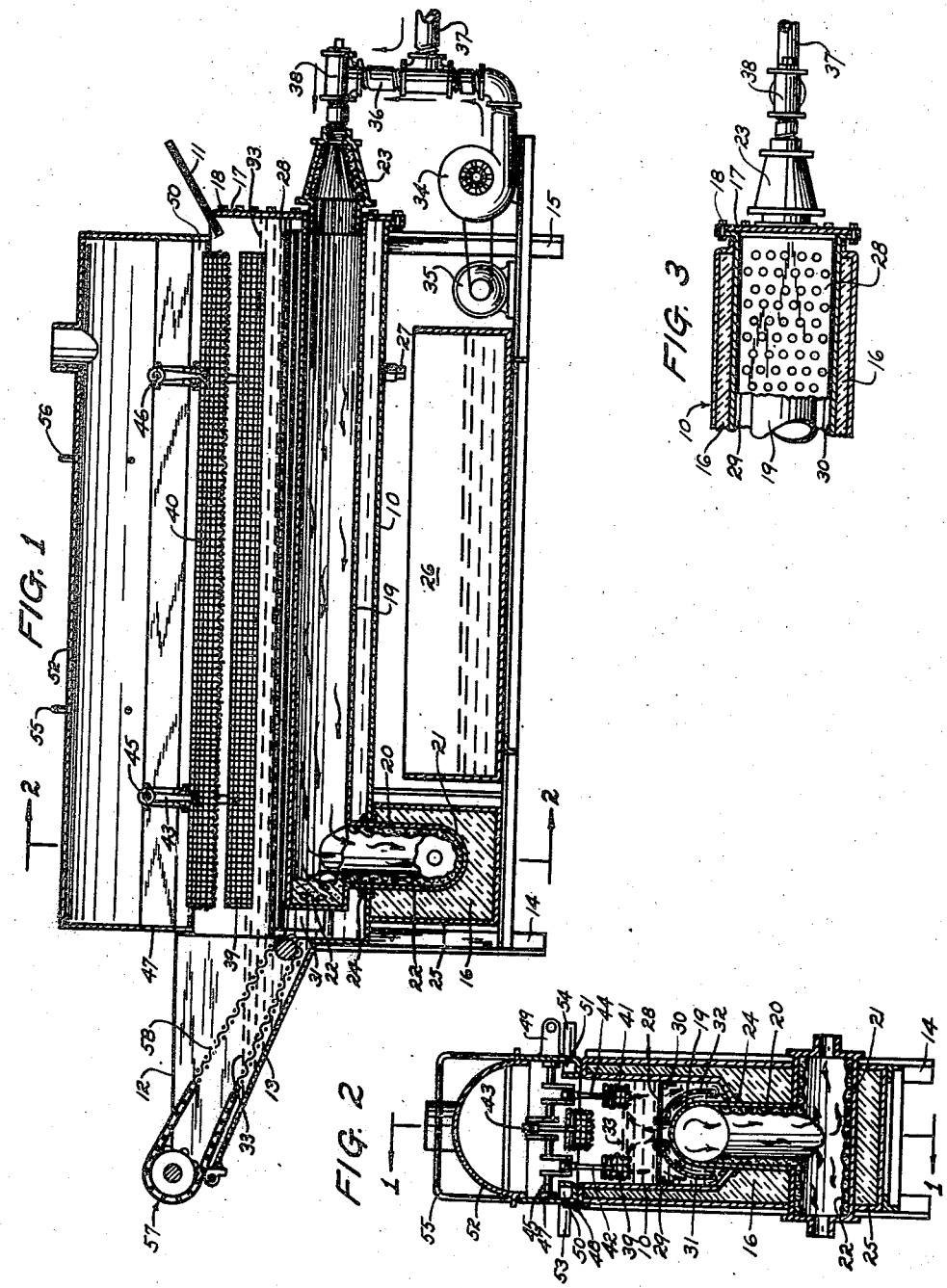
LORENZO C. BROWN
INVENTOR
BY Hubert Miller
ATTORNEY Patented July 29, 1941

2,251,111

UNITED STATES PATENT OFFICE 2,251,111

FOOD COOKING APPARATUS

Lorenzo C. Brown, Oklahoma City, Okla.

Application December 18, 1939, Serial No. 309,818

14 Claims. (Cl. 53—7)

This invention relates to commercial food cooking equipment, of the type known as "continuous fry" equipment for frying potato chips, peanuts, crullers, and any other food which is ordinarily cooked in oil.

Generally speaking, the equipment of this type in general use today includes a washing vat or tank equipped with a mechanical agitator for thoroughly washing the food; a conveyor for removing the food from the washing vat and depositing it in the cooking vat; a cooking vat or kettle which holds the oil in which the food is cooked; a burner or oven for heating oil in the cooking vat; and a conveyor for removing cooked food from the cooking vat and for depositing it in containers.

Most commercial machines of this type now on the market apply the heat immediately beneath the bottom of the cooking vat or kettle, and in order to maintain the cooking oil at or near a temperature of 360° F., as new food is added during the cooking operation, it is necessary to maintain a temperature of from 1800° F. to 2000° F. immediately beneath the kettle. The operation of such equipment is dangerous because of the fact that the cooking oil will catch fire if it reaches a temperature as high as 550° F. If for any reason the addition of cold and uncooked food to the oil in the cooking vat ceases, it is necessary that the heat be turned off immediately and that cooling of the oil in the vat (by adding cold oil and drawing off hot oil) be started immediately. Otherwise the heat already stored in the vat walls and in the oven or fire box walls raises the temperature of the cooking oil to the point of combustion. Likewise when the heater or burner ceases to operate for any reason the cooking oil must be cooled in the same manner, and the addition of food to the cooking oil must cease, because the temperature of the oil cannot be maintained constant, or even remotely so, during the oil cooling process, and if food were added it would be ruined because it would not be properly cooked.

In view of the above mentioned danger in the operation of such equipment, the chief object of my invention is the provision of a new means of heating the oil in the cooking vat or kettle, which means is so constructed as to practically eliminate the danger of fire in case the continuous addition of food to the cooking kettle ceases for any reason, or in case the heater or burner ceases to operate for any reason during the cooking operation; a means which eliminates the necessity of having to cool the oil in the cooking kettle when the heater or burner ceases to operate, because it eliminates the possibility of the temperature of the oil raising after the heater or burner has ceased to operate.

Further objects of the invention are to provide a combined cooking vat or kettle and heating means therefor which eliminates the heating of the walls and bottom of the kettle to such extreme temperatures as are necessary in equipment now in general use, with the consequent elimination of the buckling of these walls and bottom due to the extreme expansion and contraction of the material of which they are made; a cooking unit in which the kettle walls and bottom are never heated to a temperature higher than the temperature of the cooking oil because they are heated only by the contact of that oil against their inner surfaces. A food cooking unit which completely eliminates the accumulation, sticking, and burning of food particles on the inner surface of its walls at or near the oil level, thus facilitating sanitary continuous cooking of food, as well as eliminating extra time for cleaning the inside walls of the kettle or cooking vat; which makes possible the proper cooking of food throughout the major portion of the body of the cooking oil instead of in the upper few inches of the oil only, as is the method necessary with most cookers now in general commercial use; which, for the reason last mentioned is capable of cooking a much greater quantity of food in a given time than cookers of a comparative size now in general commercial use; which is so constructed as to cause the cooking oil to continuously circulate from the bottom to the top of the kettle during the cooking operation, thus maintaining a substantially even temperature throughout the body of the oil; and which makes possible the cooking of a given quantity of food with approximately one-half the quantity of oil that is required to cook the same quantity of food with similar equipment in general commercial use today, due mainly to two factors, the first of which is that less of the oil is actually burned up or vaporized because the kettle walls are kept at a temperature as low or lower than the oil temperature, and second, that much less of the oil is absorbed by the food due to the fact that the entire body of the oil is maintained at a temperature sufficiently high to sear the food the instant it is deposited in the oil, and the searing greatly reduces oil absorption.

The details in the construction of a preferred form of my invention, together with other objects attending its production, will be better understood from the following description when read in connection with the accompanying drawing, which are chosen for illustrative purposes only, and in which, Figure 1 is a longitudinal sectional view of a cooking unit embodying the invention and is taken along the line 1—1 of Figure 2;

Figure 2 is a transverse sectional view taken along the line 2—2 of Figure 1;

Figure 3 is a fragmentary sectional view illustrating certain preferred constructional details of the inlet or burner end of the unit.

Since my invention pertains to the cooking or frying unit only no other mechanisms have been illustrated as associated therewith. To aid in the understanding of the invention, however, it must be borne in mind that this cooking unit, when used for frying potato chips will be used in association with a potato peeler, a slicer, a washer, and a conveyor for removing the slices of potato from the washer and continuously emptying them into the inlet end of the cooking unit.

Referring to the drawing, the numeral 10 designates a cooking kettle or vat, the inlet end of which is fitted with a food receiving plate 11, the sides of which are flanged for directing the food into the kettle. The outlet end of the kettle 10 is provided with an elongated trough 12 of less depth but of substantially the same width as the kettle proper. The bottom 13 of this trough 12 is inclined as shown in Figure 1. The kettle is supported by legs 14 and 15. The kettle is preferably double walled, as shown clearly in Figure 3, and the space between the walls is filled with any suitable heat insulating material 16. The inlet end wall of the kettle 12 is preferably in the form of a removable plate 17 which is held in position by means of bolts 18.

A heat tube or flue 19 has an open end rigidly secured, as by welding, to the end wall 17 of the kettle, and this end wall is provided with a circular opening of a size to permit unobstructed passage of air into the open end of said tube. Near its opposite end the tube 19 is provided with a branch pipe or tube 20, one end of which communicates openly with the tube 19, and the other end of which openly communicates with a second branch tube or pipe 21 intermediate its ends, as shown in Figure 2. Both ends of the pipe 21 are open and either or both may be connected to a vent pipe (not shown) for carrying off fumes, unburned gases, etc. The interior surface of the end wall of the tube 19, as well as the interior surfaces of the branch pipes 20 and 21 are all treated with a suitable heat resisting clay 22 or other refractory material, to prevent injury to those surfaces from the intense heat provided by a burner head or tuyère 23, the interior surface of which is also so treated. It will be understood that the branch pipe 20 passes through a suitably sized aperture in the bottom of the kettle 10 and that the pipe is rigidly secured to the bottom wall of the kettle, as by welding 24, so that no liquid may leak from the kettle. The longitudinally extending heat tube 19 is thus supported in a position above the kettle bottom, and also spaced away from the side walls of the kettle, and the only place where it actually touches the kettle is at the point where its open end is secured to the end wall plate 17. With the heat tube so mounted within the kettle it is evident that longitudinal expansion and contraction of the tube, due to temperature changes, is taken care of by the bending outward or inward of the plate 17, which forms the end wall of the kettle. It will also be noted that refractory material 16 surrounds the branch pipes or tubes 20 and 21, being held in position surrounding these pipes by a suitable enclosure 25, provided for this purpose.

Beneath the kettle, a suitable oil reservoir 26 is provided for receiving oil drained from the kettle 10 through the drain plug 27.

As a means of preventing food in the kettle from actually contacting the heat tube 19, I provide a suitable screen-like or perforated guard 28 which preferably extends transversely across the kettle throughout its length, and which is supported in this position just above the heat tube 19 by means of longitudinally extending brackets 29 and 30, which are rigidly secured to the interior surface of the kettle side walls, as by welding.

As a means of causing a continuous circulation of cooking liquid around and over the heat tube 19 during the cooking process, and thus assure a substantially even temperature throughout the body of the cooking liquid, I provide a pair of elongated baffle plates 31 and 32, which are preferably but not necessarily arcuate in cross section, and which extend substantially from one end of the kettle to the other. These baffle plates are positioned on opposite sides of the tube 19 (see Fig. 2) and one side edge of each plate is rigidly secured to the guard 28 for support. Thus the guard and baffle plates may be removed from the kettle as a unit when it is desired to clean the kettle, yet when they are in position the oil or cooking liquid in the kettle is caused to circulate in the direction indicated by the arrows shown within the kettle in Figure 2. The normal level of the cooking liquid is indicated by the numeral 33.

Heat may be circulated through the heat tube 19 by a suitable means. I prefer to use gas as fuel. Accordingly I provide a small centrifugal blower 34, which is operated by a motor 35, and which blower delivers air into a pipe 36. Gas is also delivered into this pipe 36 through a branch pipe 37. The amount of gas which enters the pipe 36 is, of course, controlled in the usual manner by a regulating valve (not shown) in the pipe 37. The mixed gas and air pass through a regulating valve 38, and thence out through the burner head or tuyère 23 into the tube 19. The volume and speed of the air delivered by the blower may be controlled by changing the motor speed, and with the separate controls mentioned on the gas line 37 and just outside the burner head, the B. t. u.'s delivered into the tube 19 may be finely regulated to maintain the cooking oil at just the desired temperature.

Due to the fact that no heat is delivered by the burner head directly to the walls of the cooking kettle, it is evident that the walls are heated by the cooking liquid or oil, and will not therefore ever get hotter than the oil in the kettle. Since the oil in the kettle rarely is allowed to reach a temperature above 375° F. and certainly not above 400° F., it is evident that the kettle walls will never reach a temperature higher than those mentioned. This being so, it will be easily understood by those familiar with the art that there will neither be any buckling of the kettle walls due to extreme expansion and contraction, nor will there be any dangerous rise in the temperature of the oil in the kettle when the burner ceases to operate. Instead, the temperature of the oil will immediately begin to drop. This heating unit and manner of heating the cooking oil not only greatly reduces fire hazard, but also eliminates the present necessary practice of adding cold oil to the kettle and drawing off hot oil until the heat in the heater unit and kettle walls has been dissipated.

As previously stated, the cooking unit herein described is capable of cooking food throughout the major portion of the body of the cooking liquid instead of in the upper two or three inches only, as is true with all commercial units now on the market. As a means of keeping the food particles well distributed throughout that portion of the cooking liquid which is above the guard 28, and also as a means of simultaneously moving the food slowly from the inlet end of the kettle to the outlet trough, I provide a plurality of elongated trough-like food contacting or impeller elements 39, 40 and 41, the sides, bottoms, and ends of which are preferably constructed of mesh wire, as shown, or of perforated metal plates. Near each of their ends these elements 39, 40 and 41 are pivotally connected to the lower ends of connecting rods of any suitable type, such as illustrated in Figure 2, and designated by the numerals 42, 43 and 44. The opposite ends of these connecting rods are pivotally connected to spaced crank arms carried by power operated crank shafts 45 and 46, which are in turn journaled between the walls of a suitable four walled frame 47. The crank shafts are rotated in unison in a clockwise direction, looking at the Figure 1 view, and it will be understood by those familiar with the art that as these crankshafts rotate, the elements 39, 40 and 41 are respectively moved in a substantially circular path, from the top center of their path of movement toward the inlet end of the kettle above the surface of the cooking liquid, then down and slightly toward the outlet end of the kettle before they actually enter the cooking liquid, then through the upper half inch or so of the liquid toward the outlet end of the kettle, then up out of the liquid and to the top center of the path of movement. Since the bottoms of these elements 39, 40 and 41, are substantially flat and are substantially parallel to the surface of the cooking liquid throughout their cycles of movement, it is evident that if sufficient food particles are added to the cooking liquid, those particles or pieces will be kept pressed down into an agglomerate mass extending from the surface 33 of the cooking liquid downward to the guard 28 throughout the length of the kettle, and that this mass will simultaneously be progressively moved toward the outlet end of the kettle.

As illustrated in Figure 2, one side wall of the frame 47 is pivotally connected as by a plurality of hinges 48, to one upper side edge of the cooking kettle 10, and the opposite wall is provided with a plurality of handles 49, thus facilitating the removal of the entire impeller assembly from the kettle for cleaning purposes. From this figure of the drawing it will also be noted that the lower edge of each side wall of the frame 47 is turned inward and upward to form a pair of condensate troughs 50 and 51 which extend from one end of the frame to the other. The bottom edges of the side walls of a cross-sectionally arcuate kettle top 52 preferably fit just inside the walls of the frame 47, so that both water vapor and oil vapor which may condense on the top 52 runs down its arcuate side walls and drops into one or the other of the troughs 50 and 51. Drain pipes 53 and 54 are provided for draining condensate from these troughs. The top 52 is provided with spaced handles 55 and 56. It will be seen in Figure 1 that neither the frame 47 nor the adjacent end of the top 52 interferes with the passage of food from the receiving plate 11 into the inlet end of the kettle.

As illustrated in Figure 1, I provide in the outlet trough 12, a discharge conveyor, designated as a whole by the numeral 57. This conveyor is preferably in the nature of an endless reticulated woven wire belt 58, with its inner end extending well into the cooking liquid to a point immediately adjacent the end of the guard 28, and serves to pick up food from the cooking liquid and to carry it to a desired point, or possibly to a second conveyor, not shown.

The above described cooking unit, provided with a cooking kettle which has only approximately one-third the horizontal area of kettles normally provided for such units, will under actual test in a given period of time, cook as many potato chips as the best known (and what is generally considered as the best) commercial cooking unit now on the market, and which has a horizontal kettle area three times as great. It will cook from 40 to 48 sacks of potatoes (in chip form) in one drum of shortening, whereas the average for other commercial cooking units is 20 sacks of potatoes in one drum of shortening. Both these accomplishments are possible because of the improved means and manner of heating and maintaining the even temperature of the cooking liquid, as above described. Less of the cooking oil is absorbed by the chips because each is seared on its first contact with the oil at its very surface, and the oil throughout the length of the kettle, from the inlet end to the point where the chips actually emerge on the discharge conveyor, is maintained at a temperature sufficiently high to prevent its absorption by the chips. The closed end of the heat tube 19, being a target or focal point for the heat blast, radiates a sufficient amount of heat to keep the oil in the trough 12 at a temperature within 10° to 15° of the temperature at the inlet end of the kettle.

While I have described and illustrated a specific embodiment of my invention, I am aware that numerous alterations and charges may be made therein without departing from the inventive idea, and I do not wish to be limited except by the prior art and by the appended claims.

I claim:

1. In a cooking unit, a kettle or vat for holding cooking liquid and food stuffs; means for progressively moving food through liquid in said kettle from one of its ends to the other; a heat tube or flue positioned longitudinally within the kettle below the practical liquid level line thereof, one end of said tube passing through and rigidly attached to one wall of said kettle, said wall adapted to bend inward and outward to accommodate the longitudinal expansion and contraction of said tube, the opposite end of said tube being closed; and means for interiorly heating said tube throughout its length.

2. In a cooking unit, a kettle or vat for holding cooking liquid and food stuffs; means for progressively moving food through liquid in said kettle from one of its ends to the other; a heat tube or flue positioned longitudinally within the kettle below the practical liquid level line thereof, one end of said tube passing through and rigidly attached to one wall of said kettle, said wall adapted to bend inward and outward to accommodate the longitudinal expansion and contraction of said tube, the opposite end of said tube being closed;

means for interiorly heating said tube throughout its length; and means for preventing food in the cooking liquid from actually contacting the exterior wall surface of said tube.

3. In a cooking unit, a kettle or vat for holding cooking liquid and food stuffs; means for progressively moving food through liquid in said kettle from one of its ends to the other; a heat tube or flue positioned longitudinally within the kettle below the practical liquid level line thereof; means for interiorly heating said tube throughout its length; and longitudinally extending baffle plates spaced away from said tube and from the walls and bottom of said kettle for defining paths of circulation for the cooking liquid during the cooking process.

4. In a cooking unit, a kettle or vat for holding cooking liquid and food stuffs; means for progressively moving food through liquid in said kettle from one of its ends to the other; a heat tube or flue positioned longitudinally within the kettle below the practical liquid level line thereof, one end of said tube passing through and rigidly attached to one wall of said kettle, said wall adapted to bend inward and outward to accommodate the longitudinal expansion and contraction of said tube, the opposite end of said tube being closed; means for interiorly heating said tube throughout its length; longitudinally extending baffle plates spaced away from said tube and from the walls and bottom of said kettle for defining paths of circulation for the cooking liquid during the cooking process; and means for preventing food in the cooking liquid from actually contacting the exterior wall surface of said tube.

5. In a cooking unit, a kettle or vat for holding cooking liquid and the material to be cooked; means for progressively moving said material through liquid in said kettle from one kettle end toward the other, and for simultaneously keeping said material in an agglomerate mass during its travel; a heat tube or flue positioned within said kettle near but spaced away from its bottom and side walls and extending longitudinally therein, one end of said tube passing through and rigidly attached to one wall of said kettle, said wall adapted to bend inward and outward to accommodate the longitudinal expansion and contraction of said tube, the opposite end of said tube being closed; means for supporting the last mentioned end of said tube within said kettle; and means for interiorly heating said tube throughout its length.

6. In a cooking unit, a kettle or vat for holding cooking liquid and the material to be cooked; means for progressively moving said material through liquid in said kettle from one kettle end toward the other, and for simultaneously keeping said material in an agglomerate mass during its travel; a heat tube or flue positioned within said kettle near but spaced away from its bottom and side walls and extending longitudinally therein, one end of said tube passing through and rigidly attached to one wall of said kettle, said wall adapted to bend inward and outward to accommodate the longitudinal expansion and contraction of said tube, the opposite end of said tube being closed; means for supporting the last mentioned end of said tube within said kettle; means for interiorly heating said tube throughout its length; and a perforated or screen-like guard for preventing the material being cooked from actually contacting the tube.

7. In a cooking unit, a kettle or vat for holding cooking liquid and the material to be cooked; means for progressively moving said material through liquid in said kettle from one kettle end toward the other, and for simultaneously keeping said material in an agglomerate mass during its travel; a heat tube or flue positioned within said kettle near but spaced away from its bottom and side walls and extending longitudinally therein, one end of said tube passing through and rigidly attached to one wall of said kettle, said wall adapted to bend inward and outward to accommodate the longitudinal expansion and contraction of said tube, the opposite end of said tube being closed; means for interiorly heating said tube throughout its length; and longitudinally extending baffle plates spaced from said tube and from the walls and bottom of said kettle for defining paths of circulation for cooking liquid during the cooking process.

8. In a cooking unit which includes a kettle or container for the reception of a cooking liquid and food, a heater for heating and maintaining the contents of the kettle at a substantially even temperature throughout comprising: a heat tube or flue extending along but spaced slightly from the side walls and bottom of said kettle, one end of said tube extending through and rigidly secured to one wall of said kettle; and means for interiorly heating said tube throughout its length; the last mentioned wall of said kettle adapted to assume a convex or concave shape to permit longitudinal expansion and contraction of said tube.

9. In a cooking unit, an elongated kettle or container for cooking liquid and foodstuff; a heat tube or flue extending along but spaced slightly from the bottom and side walls of said kettle, one end of said tube extending through and rigidly secured to one end wall of said kettle, said end wall adapted to bend to allow longitudinal expansion and contraction of said tube; means for interiorly heating said tube throughout its length; and longitudinally extending baffle plates spaced from said tube and from the side walls of said kettle for defining paths of circulation for cooking liquid during the cooking process.

10. In a cooking unit, an elongated kettle or container for cooking liquid and foodstuff; a heat tube or flue extending along but spaced slightly from the bottom and side walls of said kettle, one end of said tube extending through and rigidly secured to one end wall of said kettle, said end wall adapted to bend to allow longitudinal expansion and contraction of said tube; means for interiorly heating said tube throughout its length; and a perforated or screen-like guard for preventing foodstuff in the cooking liquid from actually contacting said tube.

11. In a cooking unit, an elongated kettle or container for cooking liquid and footstuff; a heat tube or flue extending along but spaced slightly from the bottom and side walls of said kettle, one end of said tube extending through and rigidly secured to one end wall of said kettle, said end wall adapted to bend to allow longitudinal expansion and contraction of said tube; means for interiorly heating said tube throughout its length; a perforated or screen-like guard for preventing foodstuff in the cooking liquid from actually contacting said tube; and longitudinally extending baffle plates spaced from said tube and from the side walls of said kettle for defining paths of circulation for cooking liquid during the cooking process.

12. In a cooking unit which includes an elongated kettle or container for the reception of cooking liquid and food, a heater for heating and maintaining the contents of the kettle at a substantially even temperature throughout comprising: a heat tube or flue inside said kettle extending along but spaced from the side walls and bottom thereof, an open end of said tube extending through and rigidly secured to an end wall of the kettle, said end wall adapted to bend inward and outward to permit longitudinal contraction and expansion of said tube, the opposite end of said tube terminating just short of the opposite end of the kettle; a conduit passing through a wall of said kettle and rigidly secured thereto, the inner end of said conduit being in open communication with said heat tube near the last mentioned end thereof, and adapted to carry off exhaust gases from said tube and to aid in supporting the tube in said kettle; and means exterior to said kettle for interiorly heating said tube throughout its length.

13. In a cooking unit which includes an elongated kettle or container for the reception of cooking liquid and food, a heater for heating and maintaining the contents of the kettle at a substantially even temperature throughout comprising: a heat tube or flue inside said kettle extending along but spaced from the side walls and bottom thereof, an open end of said tube extending through and rigidly secured to an end wall of the kettle, said end wall adapted to bend inward and outward to permit longitudinal contraction and expansion of said tube, the opposite end of said tube terminating just short of the opposite end of the kettle; a conduit passing through a wall of said kettle and rigidly secured thereto, the inner end of said conduit being in open communication with said heat tube near the last mentioned end thereof, and adapted to carry off exhaust gases from said tube and to aid in supporting the tube in said kettle; means exterior to said kettle for interiorly heating said tube throughout its length; and longitudinally extending baffle plates spaced from said tube and from the side walls of said kettle for defining paths of circulation for the cooking liquid during the cooking process.

14. In a cooking unit which includes an elongated kettle or container for the reception of cooking liquid and food, a heater for heating and maintaining the contents of the kettle at a substantially even temperature throughout comprising: a heat tube or flue inside said kettle extending along but spaced from the side walls and bottom thereof, an open end of said tube extending through and rigidly secured to an end wall of the kettle, said end wall adapted to bend inward and outward to permit longitudinal contraction and expansion of said tube, the opposite end of said tube terminating just short of the opposite end of the kettle; a conduit passing through a wall of said kettle and rigidly secured thereto, the inner end of said conduit being in open communication with said heat tube near the last mentioned end thereof, and adapted to carry off exhaust gases from said tube and to aid in supporting the tube in said kettle; means exterior to said kettle for interiorly heating said tube throughout its length; and a perforated or screen-like guard for preventing foodstuff in the cooking liquid from actually contacting said heat tube.

LORENZO C. BROWN.